(12) United States Patent
Goo

(10) Patent No.: US 7,557,867 B2
(45) Date of Patent: Jul. 7, 2009

(54) OPTICAL ENGINE AND IMAGE PROJECTING APPARATUS HAVING THE SAME

(75) Inventor: Gyo-hwan Goo, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 629 days.

(21) Appl. No.: 11/402,850

(22) Filed: Apr. 13, 2006

(65) Prior Publication Data

US 2006/0238645 A1    Oct. 26, 2006

(30) Foreign Application Priority Data

Apr. 21, 2005    (KR)    ........................ 10-2005-0033184

(51) Int. Cl.
*H04N 5/64* (2006.01)
*G03B 21/14* (2006.01)

(52) U.S. Cl. ................. 348/787; 353/119; 353/122; 349/5; 349/7; 349/9; 349/58

(58) Field of Classification Search ............... 348/373, 348/744, 748, 788–789; 353/119, 122; 349/5, 349/7, 9, 58; 361/704, 707
See application file for complete search history.

(56) References Cited

U.S. PATENT DOCUMENTS

| | | | | |
|---|---|---|---|---|
| 6,476,986 B2* | 11/2002 | Smith et al. | ................... | 359/827 |
| 6,545,879 B1* | 4/2003 | Goodwin | ................... | 361/807 |
| 6,733,141 B2* | 5/2004 | Lee | ................... | 353/122 |
| 6,733,142 B1* | 5/2004 | Young et al. | ................... | 353/122 |
| 6,791,838 B1* | 9/2004 | Hung et al. | ................... | 361/704 |
| 6,808,272 B1* | 10/2004 | Kuo | ................... | 353/119 |
| 6,871,964 B2* | 3/2005 | Peng | ................... | 353/119 |
| 6,914,783 B2* | 7/2005 | Rogers et al. | ................... | 361/709 |
| 7,092,141 B2* | 8/2006 | Kim et al. | ................... | 359/290 |
| 7,125,125 B2* | 10/2006 | Tsai | ................... | 353/119 |
| 7,151,670 B2* | 12/2006 | Rogers et al. | ................... | 361/709 |
| 7,265,798 B2* | 9/2007 | Kim | ................... | 348/787 |
| 7,318,647 B2* | 1/2008 | Kim et al. | ................... | 353/98 |

(Continued)

FOREIGN PATENT DOCUMENTS

JP    2001-066698    3/2001

(Continued)

*Primary Examiner*—William C Dowling
*Assistant Examiner*—Danell L Owens
(74) *Attorney, Agent, or Firm*—Roylance, Abrams, Berdo & Goodman, L.L.P.

(57) ABSTRACT

An optical engine is provided that includes a base frame, a video device assembly for generating a video signal, and a driving substrate detachably coupled to the video device assembly for driving the video device assembly. The driving substrate is coupled to the base frame such that the video device assembly is disposed therebetween. A first coupling unit couples the driving substrate and the video device assembly to the base frame such that a position of the video device assembly with respect to the base frame is adjustable. A second coupling unit couples the video device assembly to the base frame to secure the adjusted position of the video device assembly to the base frame. The optical engine, and an image projecting apparatus having the same, allow the driving substrate to be replaced without adjusting a position of the video device assembly.

20 Claims, 7 Drawing Sheets

U.S. PATENT DOCUMENTS

| | | | |
|---|---|---|---|
| 7,448,757 B2 * | 11/2008 | Corn | 353/74 |
| 2002/0034023 A1 * | 3/2002 | Smith et al. | 359/827 |
| 2004/0004676 A1 * | 1/2004 | Kim | 348/787 |
| 2004/0150898 A1 * | 8/2004 | Ho | 359/811 |
| 2004/0264144 A1 * | 12/2004 | Rogers et al. | 361/719 |
| 2005/0265001 A1 * | 12/2005 | Saito | 361/710 |
| 2005/0270747 A1 * | 12/2005 | Rogers et al. | 361/709 |
| 2006/0072083 A1 * | 4/2006 | Meguro | 353/119 |
| 2006/0227514 A1 * | 10/2006 | Kang et al. | 361/719 |
| 2006/0261457 A1 * | 11/2006 | Rancuret et al. | 257/679 |

FOREIGN PATENT DOCUMENTS

| | | |
|---|---|---|
| KR | 1020020080544 | 10/2002 |

\* cited by examiner

OPTICAL ENGINE AND IMAGE PROJECTING APPARATUS HAVING THE SAME

CROSS-REFERENCE TO RELATED APPLICATIONS

This application claims the benefit under 35 U.S.C. § 119(a) of Korean Patent Application No. 2005-0033184, filed Apr. 21, 2005, in the Korean Intellectual Property Office, the entire disclosure of which is hereby incorporated by reference.

BACKGROUND OF THE INVENTION

1. Field of the Invention

The present invention relates to an optical engine and an image projecting apparatus having the same.

2. Description of the Related Art

Generally, an image projecting apparatus projects an image beam to a screen by being connected to a computer, or other similar device, for various presentations and multimedia education.

Such an image projecting apparatus includes a light source, an optical engine that generates and projects a video signal by using light emitted from the light source, and a reflection mirror that reflects the projected video signal to the screen.

FIG. 1 is an exploded perspective view of a conventional optical engine 130. As shown therein, the optical engine 130 includes a video device assembly 140 to generate the video signal, a driving substrate 150 to drive the video device assembly 140, a base frame 131 to couple with the video device assembly 140 and the driving substrate 150, a projection lens 132, a seating member 133 and a heat protection member 134.

In the conventional optical engine 130, the video device assembly 140 is first coupled with the driving substrate 150, and then coupled with the base frame 131. At this time, the position and tilt of the video device assembly 140 for the base frame 131 are adjusted through spring screws 167 to prevent light from the light source from leaking and to precisely project light to the projection lens 132.

However, in the conventional optical engine 130, as the driving substrate 150, the video device assembly 140 and the base frame 131 are all connected by the spring screws 167, the driving substrate 150 and the video device assembly 140 should be separated when unfastening the spring screw 167 to replace the malfunctioning driving substrate 150.

Furthermore, the position of the video device assembly 140 is deviated when assembling the optical engine 130. It is not easy to readjust the position of the deviated video device assembly 140 in the repairing process, thereby requiring the entire optical engine to be replaced, which increases repair costs and complicates the repair process.

Accordingly, a need exists for an improved optical engine for an image projecting apparatus in which a driving substrate is replaceable without adjusting a position of a video device assembly.

SUMMARY OF THE INVENTION

Accordingly, it is an aspect of exemplary embodiments of the present invention to provide an optical engine and an image projecting apparatus having the same in which a driving substrate is replaced without adjusting a position of a video device assembly.

Additional aspects and advantages of exemplary embodiments of the present invention are set forth in part in the description that follows and, in part, will be obvious from the description, or may be learned by practice of the present invention.

The foregoing and other aspects of exemplary embodiments of the present invention are also achieved by providing an optical engine having a base frame, a video device assembly to generate a video signal, and a driving substrate detachably coupled to the video device assembly to drive the video device assembly, and adapted to couple to the base frame such that the video device assembly is disposed therebetween. A first coupling unit couples the driving substrate and the video device assembly to the base frame to adjust a position of the video device assembly with respect to the base frame. A second coupling unit couples the video device assembly to the base frame in a such that the position of the video device assembly is adjusted.

According to an aspect of exemplary embodiments of the present invention, the second coupling unit includes a second coupling member that passes through the driving substrate and couples the video device assembly to the base frame. A penetrating part is provided on the driving substrate to allow the second coupling member to pass therethrough.

According to an aspect of exemplary embodiments of the present invention, the second coupling unit is plurally provided.

According to an aspect of exemplary embodiments of the present invention, the penetrating part is provided on the driving substrate as a polygon.

According to an aspect of exemplary embodiments of the present invention, the second coupling member is provided as a bolt.

According to an aspect of exemplary embodiments of the present invention, the video device assembly includes a digital micromirror device (DMD) panel.

According to an aspect of exemplary embodiments of the present invention, the first coupling unit has a first coupling member that couples the driving substrate and the video device assembly to the base frame, and a first coupler that is provided on the video device assembly and the driving substrate wherein an internal diameter thereof is larger than an outer diameter of the first coupling member.

According to an aspect of exemplary embodiments of the present invention, the base frame is provided with a seating member on a first side thereof, and the video device assembly and the driving substrate are coupled to the seating member.

The foregoing and other aspects of exemplary embodiments of the present invention are also achieved by providing an image projecting apparatus including a light source and an optical engine that changes light emitted from the light source into a video signal and projects the video signal. A video device assembly generates the video signal. A driving substrate is detachably coupled to the video device assembly to drive the video device assembly, and is adapted to be coupled to a base frame such that the video device assembly is disposed therebetween. A plurality of first coupling units couple the driving substrate and the video device assembly to the base frame to adjust a position of the video device assembly with respect to the base frame. A plurality of second coupling units couple the video device assembly to the base frame such that the position of the video device assembly is adjusted.

According to an aspect of exemplary embodiments of the present invention, the second coupling unit includes a second coupling member that couples the video device assembly to the base frame by passing through the driving substrate, and a penetrating part that is provided on the driving substrate to allow the second coupling member to pass therethrough.

According to an aspect of exemplary embodiments of the present invention, the base frame is provided with a seating member on a first side thereof, and the video device assembly and the driving substrate are coupled to the seating member.

Other objects, advantages and salient features of the present invention will become apparent from the following detailed description, which, taken in conjunction with the annexed drawings, discloses exemplary embodiments of the present invention.

BRIEF DESCRIPTION OF THE DRAWINGS

The above and other aspects and advantages of the present invention will become apparent and more readily appreciated from the following description of the exemplary embodiments, taken in conjunction with the accompanying drawings, of which.

Throughout the drawings, like reference numerals will be understood to refer to like parts, components and structures.

DETAILED DESCRIPTION OF EXEMPLARY EMBODIMENTS

Figure 1:
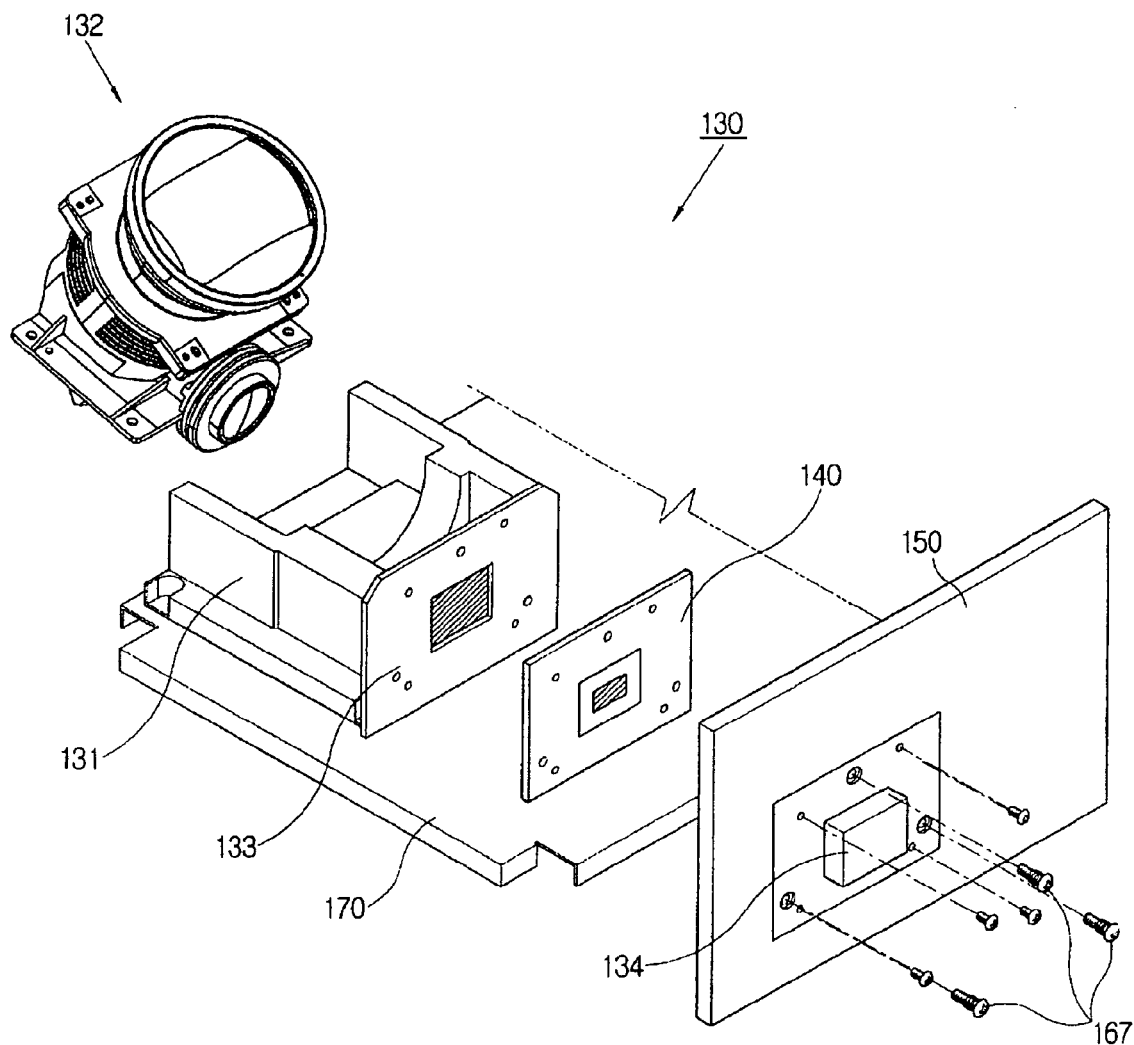
FIG. 1 is an exploded perspective view of a conventional optical engine.

An optical engine having a digital micromirror device (DMD) panel as a video device will be described in an embodiment of the present invention by way of example, but the present invention is not limited thereto.

As shown in FIGS. 2 through 5, an optical engine 30 according to an exemplary embodiment of the present invention includes a base frame 31, a video device assembly 40 to generate a video signal, and a driving substrate 50 that is detachably coupled to the video device assembly 40 to drive the video device assembly 40 and is adapted to couple to the base frame 31 such that the video device assembly 40 is disposed therebetween. A first coupling unit 60 couples the driving substrate 50 and the video device assembly 40 to the base frame 31 to adjust a position of the video device assembly 40 with respect to the base frame 31. A second coupling unit 70 couples the video device assembly 40 to the base frame 31 to secure the adjusted position of the video device assembly 40 to the base frame. The optical engine 30 may further include a seating member 33 and a heat protection member 34.

The base frame 31 supports a projection lens 32. The base frame 31 is provided with the seating member 33 on a first side thereof to which the video device assembly 40 and the driving substrate 50 are coupled. The seating member 33 may be provided with a cavity 33a on a part thereof corresponding to a video device of the video device assembly 40 to reflect the video signal from the video device to the projection lens 32. Additionally, a plurality of first couplers 61 and second couplers 71 may be provided on a circumference of the cavity 33a to couple the video device assembly 40 and the driving substrate 50. The seating member 33 may be integrally formed on the base frame 31.

Figure 3:
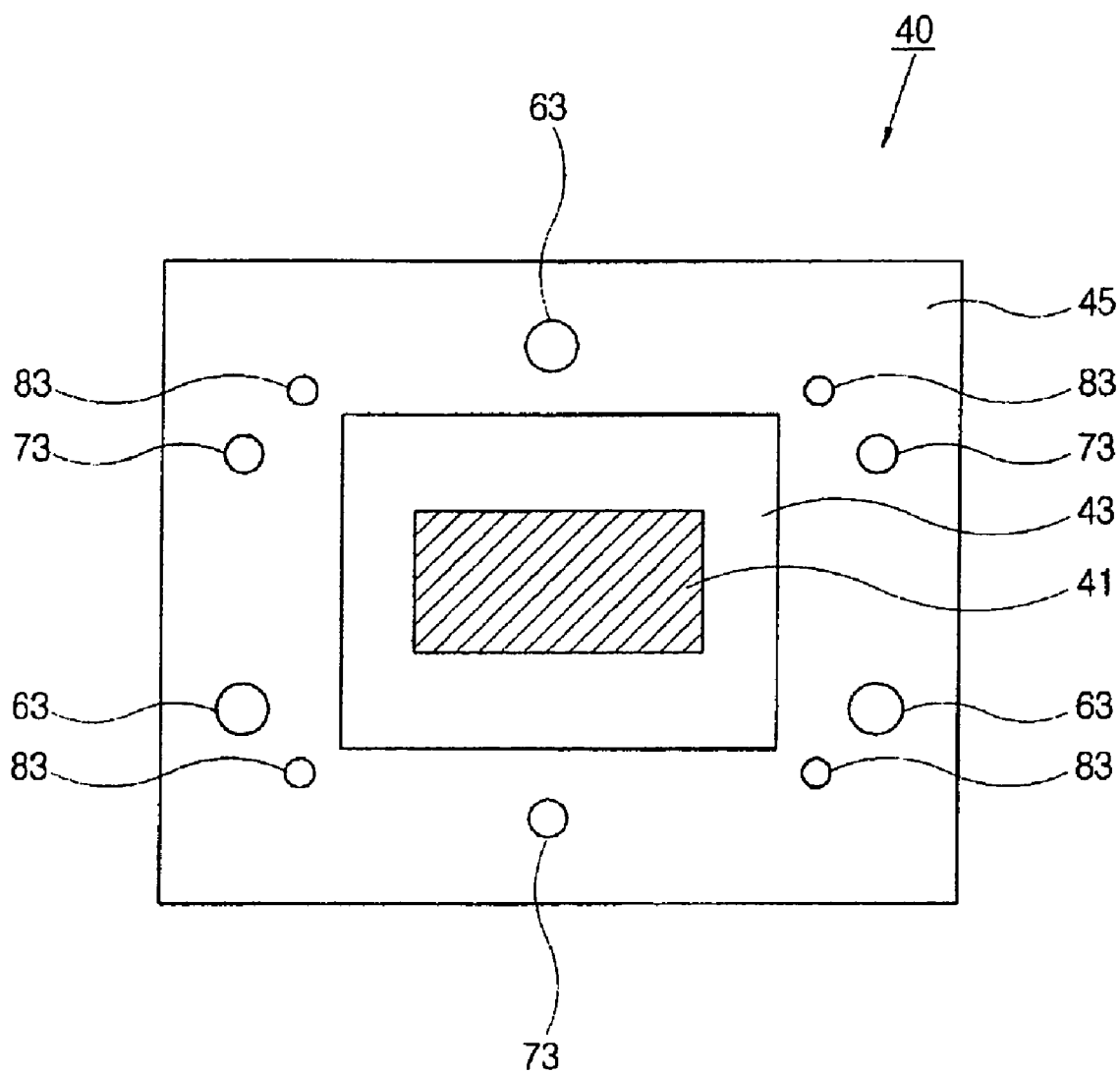
FIG. 3 is a front elevational view of a video device assembly of FIG. 2.
Figure 4:
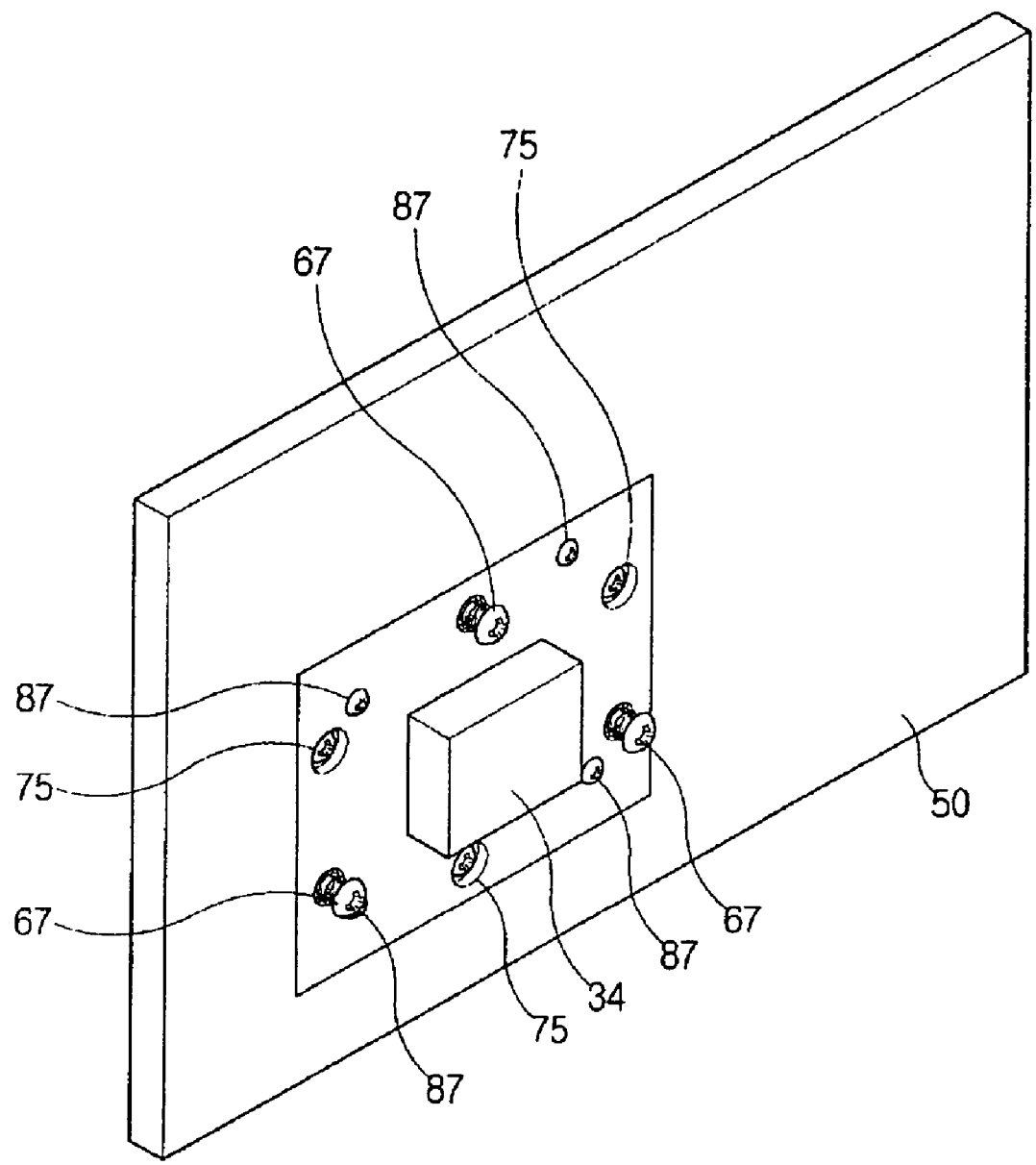
FIG. 4 is an enlarged perspective view of a driving substrate of FIG. 2.

The video device assembly 40 is driven by the driving substrate 50 and generates the video signal by using the light emitted from a predetermined light source. The video device assembly 40 may include a digital micromirror device (DMD) panel 41 as the video device to generate the video signal, an interposer 43 to electrically connect the DMD panel 41 and the driving substrate 50, and a panel support 45 to accommodate the DMD panel 41 and the interposer 43 and to couple to the driving substrate 50, as shown in FIG. 3.

The panel support 45 is formed with a third coupler 83 to couple to the driving substrate 50, a first coupler 63 for the first coupling member, and a second coupler 73 to couple to the base frame 31. The respective couplers 63, 73 and 83 may be properly provided as necessary. For example, four couplers may be provided as the third coupler 83, and three couplers may be provided as the first coupler 63 anywhere in the panel support 45.

Figure 6:
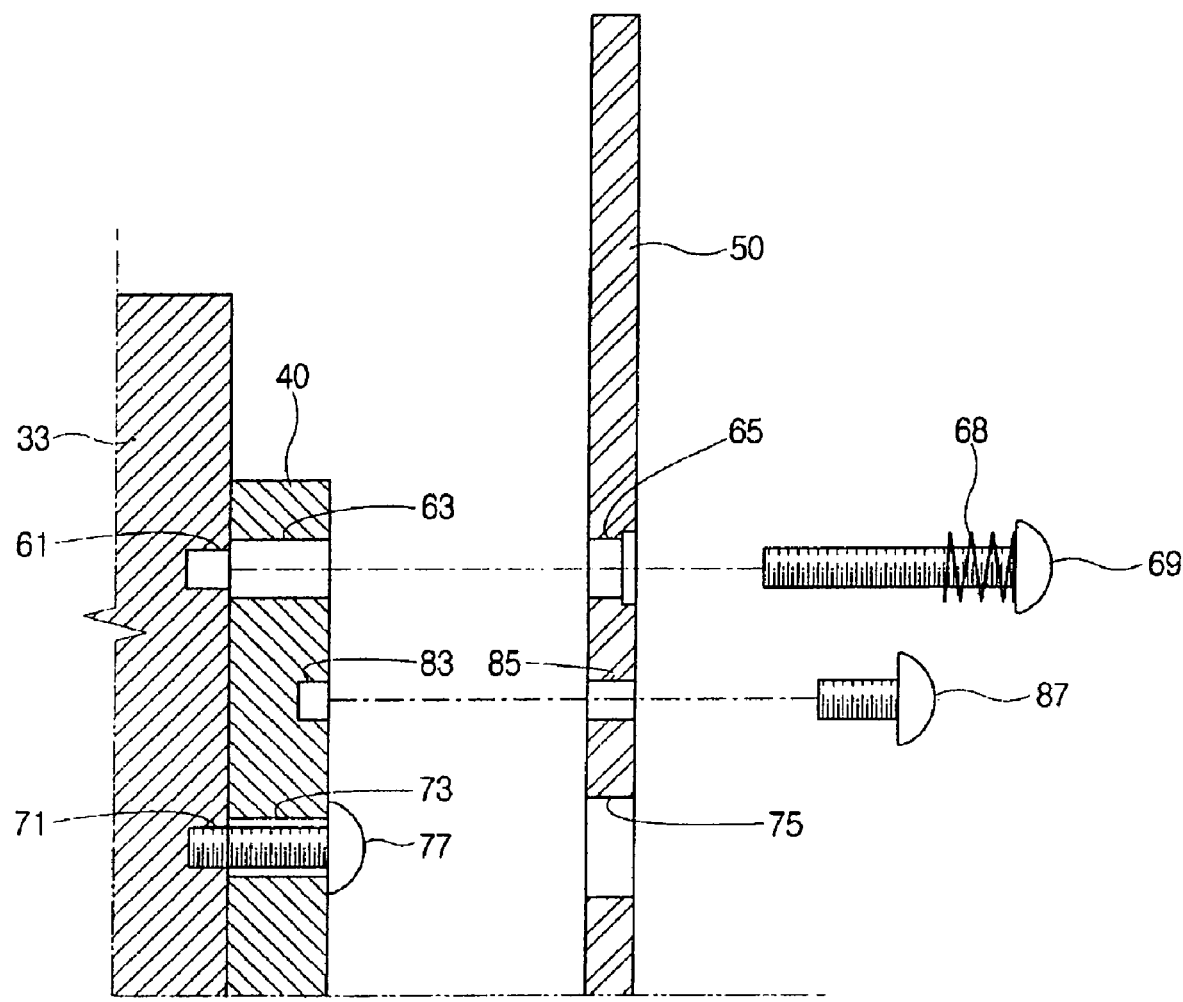
FIG. 6 is an exploded elevational view in cross section of the driving substrate separated from a seating member and the video device assembly of FIG. 5.

The driving substrate 50 drives the video device assembly 40 to make the video device generate the video signal. The driving substrate 50 is coupled to the base frame 31 after being coupled to the video device assembly 40. At least one third coupler 85 may be provided in the driving substrate 50 to couple to the video device assembly 40. The third coupling member 87 penetrates the third coupler 85 to be coupled to the video device assembly 40. At least one first coupler 65 may be provided in the driving substrate 50 to couple to the base frame 31. As shown in FIG. 6, the first coupler 65 may have a step to hold an elastic member 68 of the first coupling member 67. A penetrating part 75 may be provided on the driving substrate 50 to penetrate the second coupling member 77. A diameter of the penetrating part 75 may be larger than the maximum outer diameter of the second coupling member 77 to make the second coupling member 77 pass through the driving substrate 50 and be coupled to the video device assembly 40. Thus, the driving substrate 50 is not affected by the coupling and detaching of the second coupling member 77. A heat protection member 34 may be provided on one side of the driving substrate 50 opposite to the other side coupled to the video device assembly 40 so that heat from the video device assembly 40 is discharged to the outside. The heat protection member 34 may be shaped like a fin, but the shape thereof is not limited thereto. A fan may be additionally provided on a first side of the heat protection member 34 to supply air to the heat protection member 34.

The first coupling unit 60 includes the first couplers 61, 63 and 65. The first coupling member 67 adjusts the video device assembly 40, for example, to adjust the position and the tilt of the video device assembly 40 with respect to the base frame 31.

The first couplers 63 and 65 may have an internal diameter that is larger than an outer diameter of the first coupling member 67 to make the video device assembly 40 move upwards and downwards and to the right and left with respect to the base frame 31 such that the first coupling member 67 is temporarily coupled to adjust the position of the video device assembly 40.

The first coupling member 67 couples the base frame 31, the video device assembly 40 and the driving substrate 50 to keep the position of the video device assembly 40 after adjusting the position thereof. The first coupling member 67 may include a bolt 69 and the elastic member 68, but is not limited thereto. The elastic member 68 may be a coil spring, but is not limited thereto. The elastic member 68 is coupled to the first coupling member 67 to press the video device assembly 40 to the base frame 31. The first coupler 65 may be formed with a step to support the elastic member 68.

The first coupling unit 60 may be properly provided as necessary. For example, as shown in FIG. 3, three, four or more, or two or less units may be provided as the first coupling unit 60. A plurality of first coupling units 60 may be variously disposed as necessary. For example, the plurality of first coupling units 60 may be disposed in a triangular configuration, rectangular configuration, or any other suitable configuration.

The second coupling unit 70 includes a second coupling member 77, the second couplers 71 and 73, and the penetrating part 75 to couple the video device assembly 40 and the base frame 31 such that the position of the video device assembly 40 is adjustable by the first coupling units 60.

The second coupling member 77 passes through the penetrating part 75 formed on the driving substrate 50 to couple the video device assembly 40 to the base frame 31. As the second coupling member 77 fully passes through the penetrating part 75, it is not interfered by the driving substrate 50. Even if the driving substrate 50 is detached from the video device assembly 40, the second coupling member 77 maintains the coupling state of the video device assembly 40 and the base frame 31. The second coupling member 77 may be provided as a bolt, but is not limited thereto.

Meanwhile, the second coupling member 77 may be properly provided. As shown in FIG. 3, three second coupling members 77 may be provided by way of example. Alternatively, three and more or less second coupling members 77 may be provided by way of example. The second coupling unit 70 may be disposed to form various shapes.

The penetrating part 75 is provided in the driving substrate 50. An internal diameter of the penetrating part 75 may be larger than the maximum outer diameter of the second coupling member 77 to allow the second coupling member 77 to pass therethrough.

Figure 2:
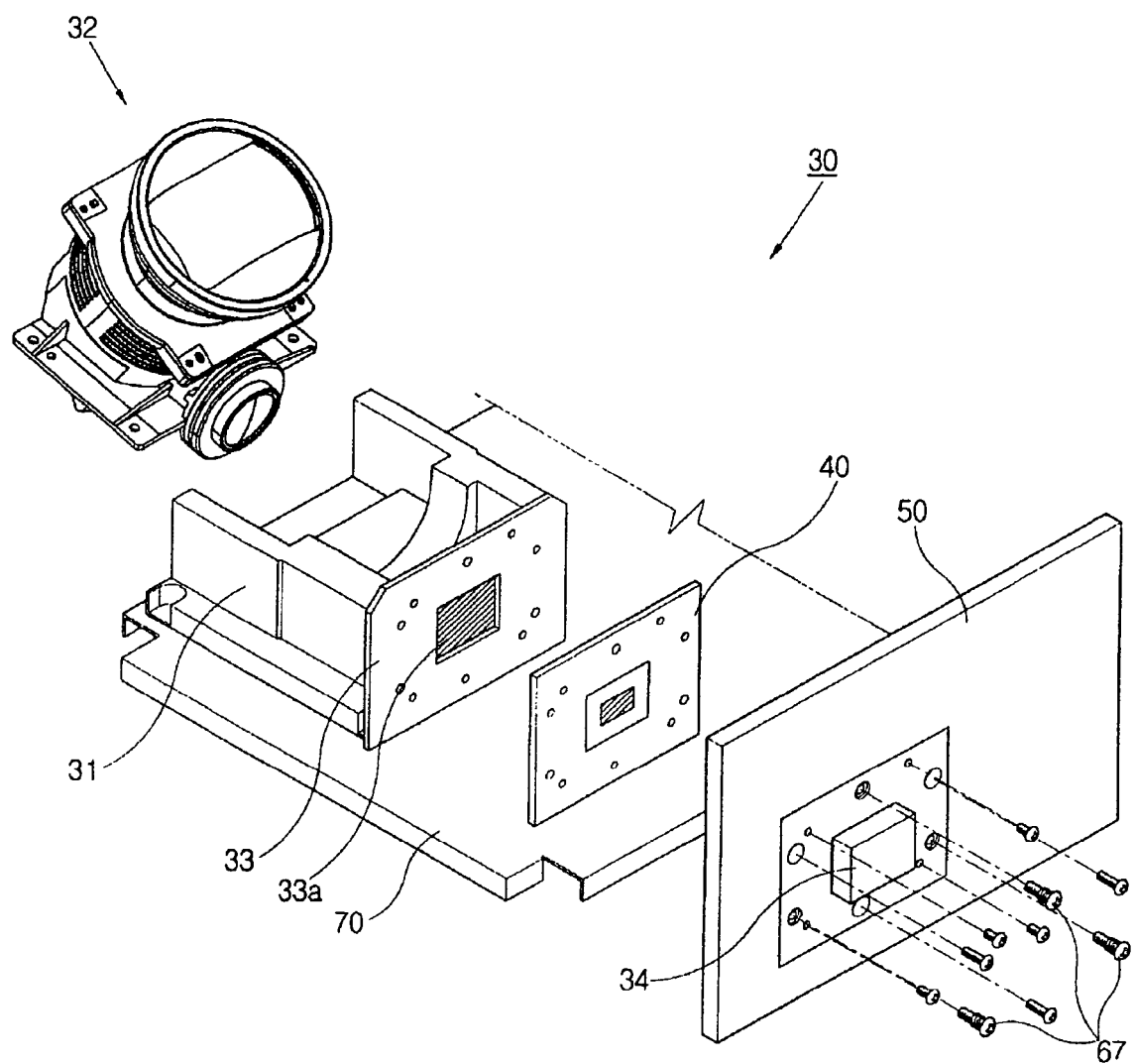
FIG. 2 is an exploded perspective view of an optical engine according to an exemplary embodiment of the present invention.
Figure 5:
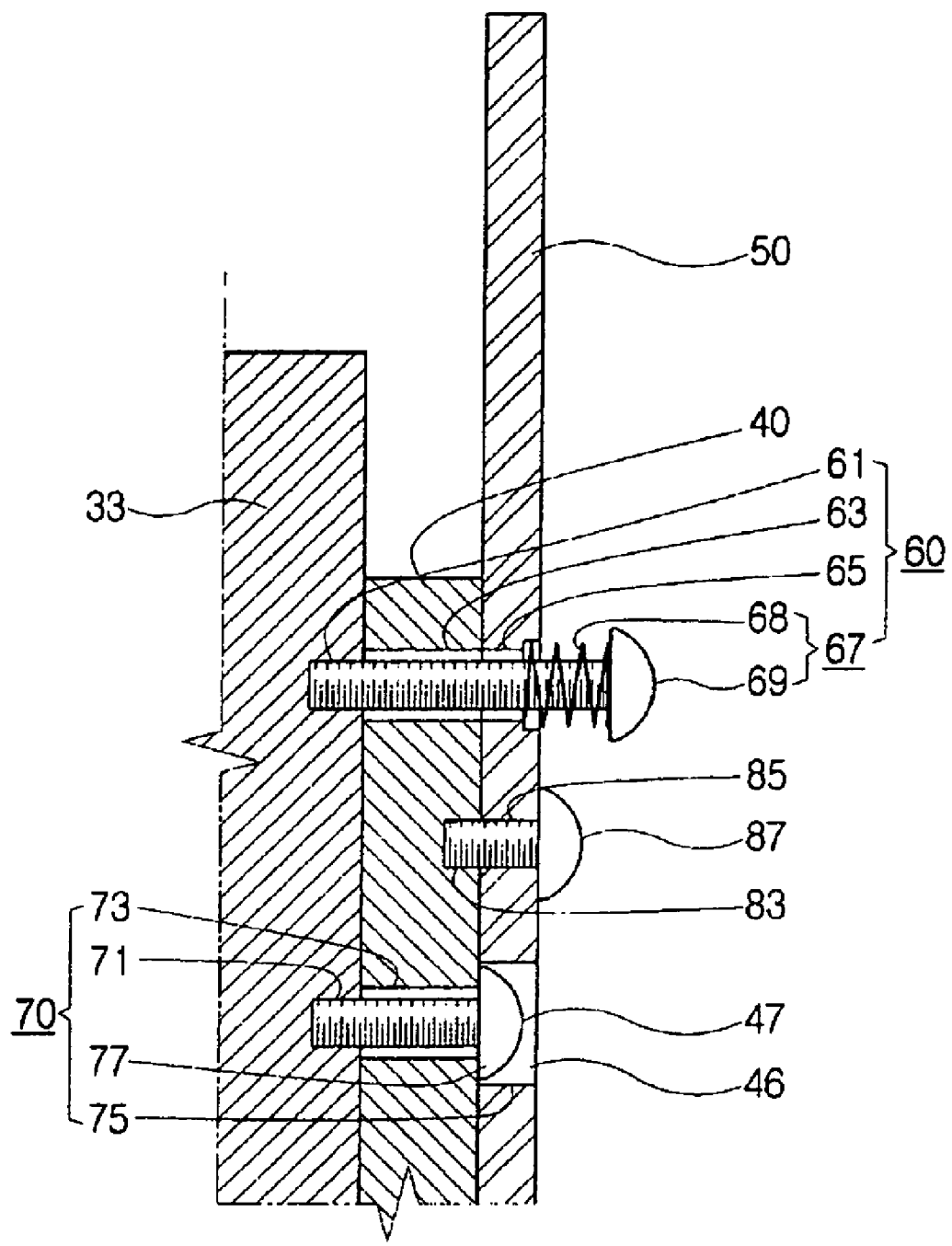
FIG. 5 is an enlarged elevational view in cross section of a coupling main part of FIG. 2.

The assembling and disassembling processes of the optical engine with the foregoing configuration is described hereafter with reference to FIGS. 2 and 5.

First, the video device assembly 40 is coupled to the driving substrate 50 by the third coupling member 87. A plurality of third coupling members 87 may be used to substantially prevent relative motion between the video device assembly 40 and the driving substrate 50.

Then, the driving substrate 50 coupled to the video device assembly 40 is coupled to the base frame 31 or the seating member 33 provided on a first side of the base frame 31. The first coupling units 60 are used to adjust the position of the video device assembly 40. When the position of the video device assembly 40 is properly adjusted, the second coupling member 77 passes through the penetrating part 75 of the driving substrate 50 to couple the video device assembly 40 to the base frame 31, or to the seating member 33. Because the internal diameter of the penetrating part 75 provided on the driving substrate 50 is larger than the maximum outer diameter of the second coupling member 77, the second coupling member 77 is not affected by the driving substrate 50.

The first coupling member 67 is unfastened and the driving substrate 50 is detached from the base frame 31, as shown in FIG. 6. Because the second coupling member 77 does not interfere with the driving substrate 50, the video device assembly 40 maintains the coupling state with the base frame 31 even when the driving substrate 50 is detached therefrom.

Accordingly, if the first coupling units 60 are released to replace the driving substrate 50, the video device assembly 40 and the base frame 31 are coupled to each other by the second coupling unit 70, and the adjusted position of the video device assembly 40 is maintained.

Figure 7:
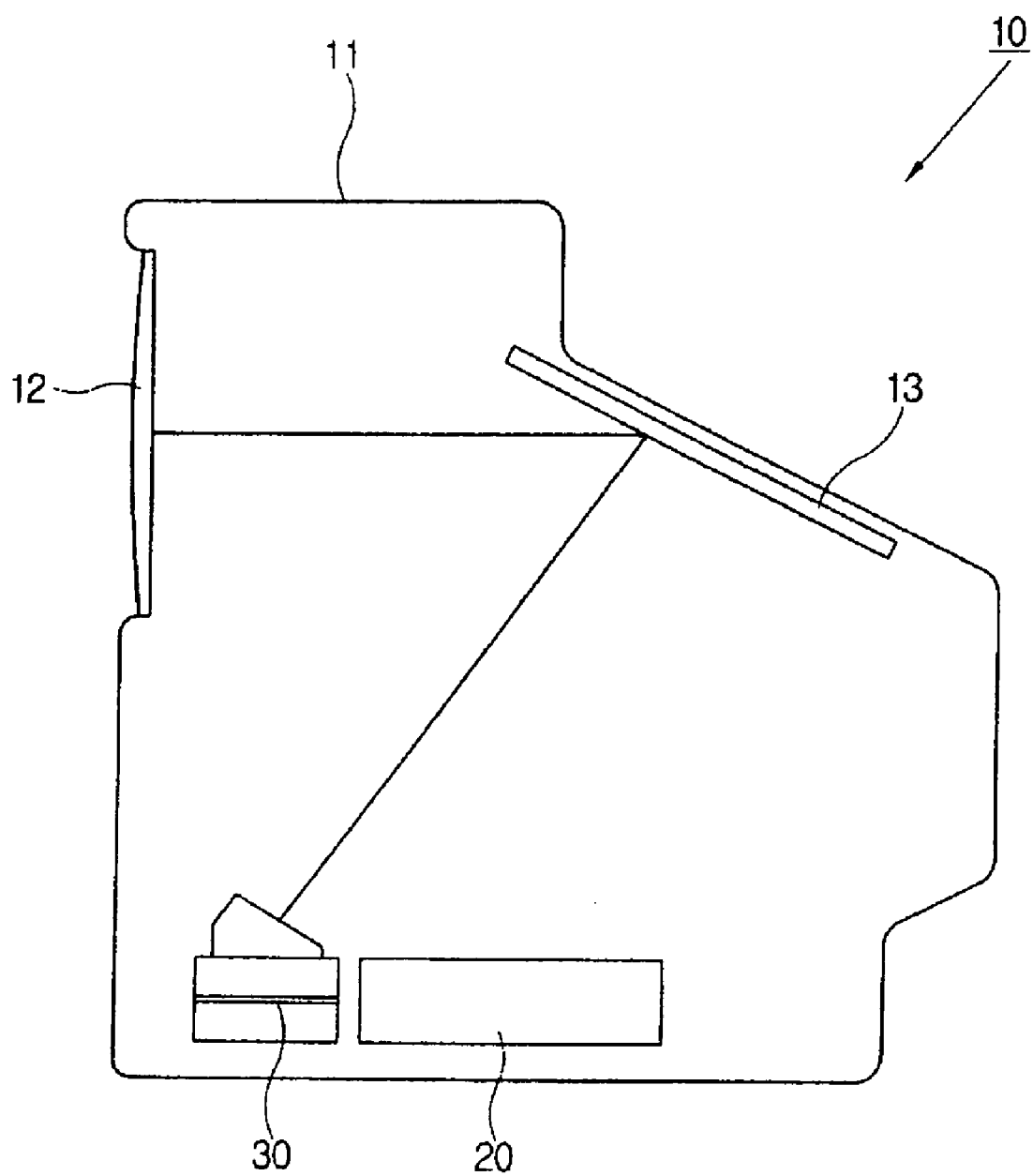
FIG. 7 is a schematic diagram of an image projection apparatus of the optical engine according to an exemplary embodiment of the present invention.

FIG. 7 illustrates the configuration of an image projecting apparatus with the optical engine 30 according to exemplary embodiments of the present invention.

An image projecting apparatus 10 according to exemplary embodiments of the present invention includes a housing 11, a light source 20 to emit light, the optical engine 30 having the foregoing configuration, and a reflection mirror 13 to reflect the video signal from the optical engine 30 to a screen 12. The description of the optical engine 30 is omitted as it is described above.

In the image projecting apparatus 10 according to exemplary embodiments of the present invention, because the video device assembly 40 maintains its position with respect to the base frame 31 when coupled to the base frame 31, the whole optical engine 30 does not need to be replaced even if the driving substrate 50 is separated or replaced due to a malfunction thereof.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical engine, comprising:
    a base frame;
    a video device assembly to generate a video signal;
    a driving substrate detachably coupled to the video device assembly to drive the video device assembly, and adapted to be coupled to the base frame such that the video device assembly is disposed therebetween;
    a first coupling unit adapted to couple the driving substrate and the video device assembly to the base frame such that a position of the video device assembly with respect to the base frame is adjustable; and
    a second coupling unit adapted to couple the video device assembly to the base frame when the position of the video device assembly has been adjusted.

2. The optical engine according to claim 1, wherein the second coupling unit includes
    a second coupling member adapted to pass through the driving substrate to couple the video device assembly to the base frame; and
    a penetrating part in the driving substrate through which the second coupling member passes.

3. The optical engine according to claim 2, wherein a plurality of second coupling units couple the video device assembly to the base frame.

4. The optical engine according to claim 3, wherein the penetrating parts form a polygonal shape on the driving substrate.

5. The optical engine according to claim 2, wherein the second coupling member is a bolt.

6. The optical engine according to claim 1, wherein the video device assembly includes
    a digital micromirror device (DMD) panel.

7. The optical engine according to claim 1, wherein the first coupling unit includes
    a first coupling member adapted to couple the driving substrate and the video device assembly to the base frame; and a first coupler in the video device assembly and the driving substrate wherein an internal diameter thereof is larger than an outer diameter of the first coupling member.

8. The optical engine according to claim 1, wherein the base frame has a seating member on a first side thereof, and the video device assembly and the driving substrate are coupled to the seating member.

9. The optical engine according to claim 7, wherein a flexible member is disposed on the first coupling member to facilitate adjusting the video device assembly with respect to the base frame.

10. The optical engine according to claim 9, wherein the first coupler in the driving substrate has a stepped portion adapted to receive the flexible member.

11. The optical engine according to claim 10, wherein a plurality of first coupling units couple the video device assembly and the driving substrate to the base frame.

12. The optical engine according to claim 11, wherein the plurality of first coupling units form a polygonal shape on the driving substrate.

13. An image projecting apparatus, comprising:
a light source;
an optical engine adapted to change light emitted from the light source into a video signal and to project the video signal; the optical engine including
a base frame;
a video device assembly adapted to generate the video signal;
a driving substrate detachably coupled to the video device assembly to drive the video device assembly, and adapted to be coupled to the base frame such that the video device assembly is disposed therebetween;
a plurality of first coupling units adapted to couple the driving substrate and the video device assembly to the base frame such that a position of the video device assembly with respect to the base frame is adjustable; and
a plurality of second coupling units adapted to couple the video device assembly to the base frame when the position of the video device assembly has been adjusted.

14. The image projecting apparatus according to claim 13, wherein the second coupling unit includes
a second coupling member adapted to couple the video device assembly to the base frame by passing through the driving substrate; and
a penetrating part in the driving substrate through which the second coupling member passes.

15. The image projecting apparatus according to claim 14, wherein
the base frame has a seating member on a first side thereof, and the video device assembly and the driving substrate are coupled to the seating member.

16. The image projecting apparatus according to claim 13, wherein
the base frame has a seating member on a first side thereof, and the video device assembly and the driving substrate are coupled to the seating member.

17. The image projecting apparatus according to claim 13, wherein the first coupling unit includes
a first coupling member adapted to couple the driving substrate and the video device assembly to the base frame; and
a first coupler in the video device assembly and the driving substrate wherein an internal diameter thereof is larger than an outer diameter of the first coupling member.

18. The image projecting apparatus according to claim 17, wherein
a flexible member is disposed on the first coupling member to facilitate adjusting the video device assembly with respect to the base frame.

19. The image projecting apparatus according to claim 18, wherein
the first coupler in the driving substrate has a stepped portion adapted to receive the flexible member.

20. The optical engine according to claim 14, wherein the penetrating part has a diameter larger than the maximum outer diameter of the second coupling member.

* * * * *